(12) United States Patent
Martinek et al.

(10) Patent No.: US 8,311,990 B2
(45) Date of Patent: Nov. 13, 2012

(54) FRAGMENTED DATA FILE FORENSIC RECOVERY SYSTEM AND METHOD

(76) Inventors: Michael Martinek, Seattle, WA (US); David Martinek, Lynnwood, WA (US)

( * ) Notice: Subject to any disclaimer, the term of this patent is extended or adjusted under 35 U.S.C. 154(b) by 261 days.

(21) Appl. No.: 12/103,405

(22) Filed: Apr. 15, 2008

(65) Prior Publication Data

US 2008/0279418 A1 Nov. 13, 2008

Related U.S. Application Data

(60) Provisional application No. 60/911,967, filed on Apr. 16, 2007.

(51) Int. Cl.
*G06F 7/00* (2006.01)
*G06F 17/00* (2006.01)
(52) U.S. Cl. ..................................................... 707/649
(58) Field of Classification Search .................. 707/649
See application file for complete search history.

(56) References Cited

U.S. PATENT DOCUMENTS

| | | | |
|---|---|---|---|
| 5,619,497 A | 4/1997 | Gallagher et al. | |
| 5,870,394 A | 2/1999 | Oprea | |
| 5,917,820 A | 6/1999 | Rekhter | |
| 6,397,311 B1 | 5/2002 | Capps | |
| 6,640,326 B1 | 10/2003 | Buckingham et al. | |
| 7,013,392 B1 | 3/2006 | Sasaki et al. | |
| 7,110,608 B2 | 9/2006 | Chan et al. | |
| 7,142,564 B1 | 11/2006 | Parruck et al. | |
| 7,155,448 B2 | 12/2006 | Winter | |
| 7,296,180 B1 * | 11/2007 | Waterhouse et al. | 714/6.12 |
| 2002/0133491 A1 * | 9/2002 | Sim et al. | 707/10 |
| 2003/0018978 A1 | 1/2003 | Singal et al. | |
| 2003/0126201 A1 | 7/2003 | Hoang | |
| 2004/0243905 A1 | 12/2004 | Merritt | |
| 2006/0080517 A1 * | 4/2006 | Brown | 711/163 |

FOREIGN PATENT DOCUMENTS

| | | |
|---|---|---|
| EP | 1668506 | 6/2006 |
| JP | 2005189972 | 7/2005 |

OTHER PUBLICATIONS

Amigoni, F., et al., "A Method for Reassembling Fragments in Image Reconstruction," Image Processing, vol. 3, III-581-4 vol. 2 (2003).
Park, Jong W., et al., "Recovery of Corrupted Image Data Based on the NURBS Interpolation," Circuits and Systems for Video Technology, IEEE Transactions, vol. 9 , Issue: 7, 1003-1008 (1999).
Chowdhury, S., "On Message Resequencing in Computer Networks," Computers and Communications, Conference Proceedings, Eighth Annual International Phoenix Conference, Mar. 22-24, 1989, pp. 231-235.
Pal, A., et al., "Automated Reassembly of Fragmented Images," Acoustics, Speech, and Signal Processing, vol. 4, IV-732-5 vol. 4 (2003).
Memon, N., and Paul, A., "Automated Reassembly of File Fragmented Images Using Greedy Algorithms,"IEEE Transactions on Image Processing, vol. 15, Issue: 2, 385-393 (2006).

* cited by examiner

*Primary Examiner* — Van Oberly
(74) *Attorney, Agent, or Firm* — Dinsmore & Shohl LLP

(57) ABSTRACT

A system and method of reassembly a file from fragmented data written onto digital storage media are disclosed. The data reassembling system and method is particularly useful for image data reconstruction, and in forensic data recovery. More particularly, the inventive concept allows for reassembling out-of-sequence data fragments.

4 Claims, 7 Drawing Sheets

Fragmented Evidence Recovery Suite

- Welcome to FERS
- Acquire New Image
- Process Existing Image
- Verify Existing Image
- Acquire Headers Acquiring a new image allows you to generate a forensic snapshot of any selected digital input media. While the acquiry process never issues any writes to the selected media, you should always use a hardware and/or software write blocker to prevent any writes to the forensic source. While generating the new forensic image, you will be able to configure options that will enable FERS to effiently and automatically recover fragmented data from the source at a later time.

Detected Partitions:

| Drive | Type | Estimated Size | Label |
|-------|------|----------------|-------|
| \\.C: | Fixed | 102.42 GB | Local Disk |
| \\.D: | Fixed | 7.56 GB | HP_RECOVERY |
| \\.E: | CD-ROM | Unknown | Unknown |
| \\.F: | Fixed | 39.06 GB | Development |
| \\.G: | CD-ROM | Unknown | Unknown |

Detected Partitions:

| Device Details | Estimated Size | Physical Name |
|----------------|----------------|---------------|
| Hitachi HTS541616J9S SB40 | 149.05 GB | \\.\PHYSICALDRIVE0 |
| MATSHITA DVD-RAM UJ-851S 1.50 | Unknown | \\.\CDROM0 |
| JPT332J HPT238D 1.0 | Unknown | \\.\CDROM1 |

Selected Acquiry Source: \\.\D:

FRAGMENTED DATA FILE FORENSIC RECOVERY SYSTEM AND METHOD

FIELD OF THE INVENTION

The present invention is related to data reassembly and in particular to systems and methods of forensically recovering information from digital data media that has been fragmented across the media without the aid of an intact primary or secondary file table.

BACKGROUND OF THE INVENTION

Current digital forensic tools lack the ability to recover fragmented digital evidence (i.e., data files) where file tables in a data storage medium have been damaged and/or destroyed. In fact, many court cases based upon digital evidence where the data is fragmented on large capacity hard disks are dismissed. The primary reason for this dismissal is the enormous cost in having an analyst attempt to manually reassemble the fragmented data into files. Currently, the manual recovery process requires an analyst to manually review and restore data sectors on the data storage medium containing the digital evidence and manually reassemble the fragmented file by carving data sectors off the medium.

Data carving is the practice of searching for files, data, strings, or other kinds of objects based on content in order to recover files and the corresponding fragments of files when file table entries are corrupt or missing, as may be the case when files have been deleted or when performing an analysis on logically damaged media. Once carved, the analyst would then attempt to open the file with a viewer appropriate to its file type. The resulting carved file would not render fully and/or successfully load in its respective viewer(s) unless all sectors of data were properly carved out and placed in the correct order. If the manual data carving process fails, the analyst would then either have to reattempt the data carving process or deem it as not feasibly recoverable. Such a manual task performed on digital data media having gigabytes of information is both time consuming and expensive.

Current computer implemented methods to reassemble fragmented files mostly require a rather explicit set of circumstances not likely to be encountered in a real world scenario by a forensic analyst. For example, the publication by N. Memon and A. Pal, "Automated reassembly of file fragmented images using greedy algorithms," in *IEEE Transactions on Image Processing*, Vol. 15, Issue: 2, 385-393 (2006) (herein after "the Memon publication"), while providing interesting insight into the manipulation of image fragments, does not take into account any sort of compressed graphical format. Also, the Memon publication outlines a method, in essence, that evaluates all possible permutations of an image (also frequently referred to as brute force) and then analyzes the rendered image to match fragments together via pixel matching, sum of differences, and median edge detection.

Pixel matching, in short, is a comparison of the color of a pixel on one edge of a fragment to the color of a pixel on the next possible edge of a fragment. Problems can arise with this method in several common situations. First, if the next fragment of data does not belong to the picture but rather to a data file (such as an executable), pixel matching would immediately fail in that it may believe the data from the executable file is valid bitmap data due to a lack of structure in the bitmap format. Second, this method as outlined requires a 24-bit per pixel bitmap format, with no compression. If any compression is introduced whatsoever, this method would not be reliable. For example, 24-bit per pixel bitmaps can utilize run-length encoding (RLE).

To briefly outline RLE, data is compressed by finding repeating values and substituting them with the number of times the value repeats, and only one copy of the value itself. For example, take the string "HHHHHHHEEEELLLOOO". If RLE were implemented against this string, the resulting output would be "7H4E3L3O". In an uncompressed bitmap, "HHH" would be a pixel. "HHH" would again repeat. "HEE", "ELL" "LOO" and "OOO" would follow. Each set of data would have a corresponding pixel color associated with it. If compression is implemented, the method outlined by the Memon publication may very well see the number of times a value is repeated and believe it to be a valid pixel color for use in comparison. In result, it would be comparing "HHH" from the uncompressed string to "7H4" in the compressed string. This can result in both false positives and false negatives. Once two pixels have been compared and found to have exactly the same value, it adds one to a count. The higher the count value after completing its comparison, the greater the likelihood the two fragments belong to each other.

Sum of differences (SoD) is a very similar technique to pixel matching. SoD compares pixels across the borders of fragments, takes the absolute value of the difference in byte values between two adjacent pixels, and then sums all of the calculated absolute values together. According to this technique, the lower the final value, the more likely the fragments belong together. This technique is heavily reliant upon several "laboratory" conditions in order to provide reliable results. Take, for example, two bitmap fragments that are from different images that also differ in dimension. One such fragment of data, which for example is 4 kB in size, could be a fragment from a 500×500 bitmap or a fragment of a 1000× 1000 bitmap. It can easily produce false positives since the borders cannot be accurately determined without first rendering the image. The 4 kB fragment of data may span two rows in the smaller bitmap, or it may not even fill a complete row on the larger one. Second, SoD can produce false positives when comparing non-bitmap fragments. Again, using a fragment of data from an executable file as we did in our previous example, it will attempt to establish the borders and then compare the results. Third, SoD can result in false positives when comparing fragments from similar images. Because SoD is looking for similar borders that seem most likely to fit, it cannot be exact. Because of this, pictures taken of natural scenes, cities, or even photos taken of a person in a similar pose can wind up mashed together. The Memon publication provides an example where the edge of a fragment of a dog lined up with the top edge of a photo of a jet, and another fragment from the dog photo lined up with the tail of the jet. As images become larger and larger, the margin for error increases significantly. The 4 KB fragment of data in a large image file will give very little basis for comparison.

The third technique described in the Memon publication is called median edge detection (MED). MED compares the value of a pixel color to the values of the pixels above it, to left of it, and to the upper left diagonal. It then takes the sum of the absolute value of the difference between the predicted value and the actual value. In short, by looking at the pixel colors around it, it derives a predicted value for the next pixel. The smaller the difference in the prediction to the actual value of the pixel after the fragment was added, the more likely it matches. This method is again similar to the two above except that it uses a different calculation in looking for the smallest change in color from one edge of a fragment to the next. This has the same shortfalls as the other techniques. Fragments will likely be mashed together improperly, especially if there is file fragmentation on the hard drive.

The above techniques are useful basically on smaller, uncompressed bitmap files. However, in real world conditions, due primarily to consumer preferences, photographs are normally bright and crisp and provided in a large format. All of these qualities introduce significant problems that the above mentioned techniques fail to take into consideration and overcome. In addition, although prior art forensic tools do allow the rendering of recovered image files, they do not allow the analyst to add sectors, remove sectors, or otherwise make intelligent alterations. Prior art forensic tools also make no additional attempt to recover fragmented data except through "Header to Header" or "Header to Footer" techniques. Neither of these techniques accurately recovers a file when there is any fragmentation involved.

SUMMARY OF THE INVENTION

It is against the above background that the present invention provides a data reassembling system or method particularly for image data reconstruction (herein after referred to as "FERS") that addresses the above mentioned problems. In one specific application, the present invention is useful in forensic data recovery. More particularly, the inventive concept allows for reassembling out-of-sequence data fragments, and for reassembling out-of-sequence data fragments found on large capacity digital media (i.e., data storage medium) into a logical file.

These and other features and advantages of the invention will be more fully understood from the following description of various embodiments of the invention taken together with the accompanying drawings.

BRIEF DESCRIPTION OF THE DRAWINGS

FIGS. 2-4 are screenshots of a graphical user interface of the data reassembly application of FIG. 1 providing a feature according to the present invention;

DETAILED DESCRIPTION OF THE INVENTION

Before the present system and methods are described, it is to be understood that this invention is not limited to particular hardware or software described, as such may, of course, vary. It is also to be understood that the terminology used herein is for the purpose of describing particular embodiments only, and is not intended to be limiting.

Unless defined otherwise, all technical terms used herein have the same meaning as commonly understood by one of ordinary skill in the art to which this invention belongs. Although any methods and systems similar or equivalent to those described herein can be used in the practice or testing of the present invention, the preferred methods and systems are now described.

It must be noted that as used herein, the singular forms "a", "and", and "the" include plural referents unless the context clearly dictates otherwise. Thus, for example, reference to "a result" includes a plurality of such results and reference to "a logical file" includes reference to one or more logical files and equivalents thereof known to be those skilled in the art, and so forth.

All publications mentioned herein are incorporated herein by reference to disclose and describe the methods and/or systems in connection with which the publications are cited. However, it is to be appreciated that the publications discussed herein are provided solely for their disclosure prior to the filing date of the present application. Nothing herein is to be constructed as an admission that the present invention is not entitled to antedate such publication by virtue of prior invention. Further, the dates of the publication provided may be different from the actual publication dates which may need to be independently confirmed.

Figure 1:
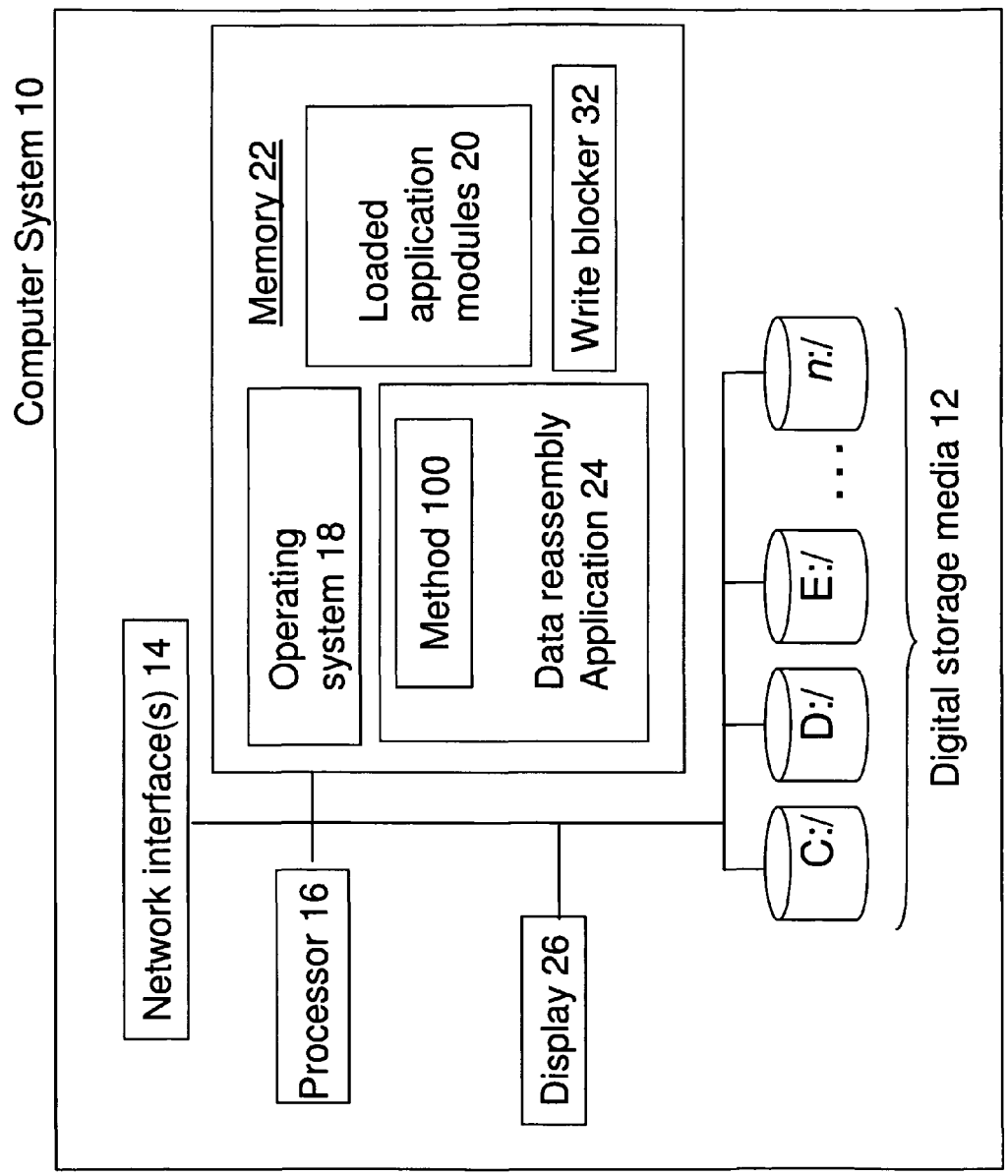
FIG. 1 is a block diagram of a computer system configured with a data reassembly application and method according to the present invention.

FIG. 1 illustrates one example of computer system 10 in accordance with one embodiment of the invention. The computer system is provided with locally attached digital storage media 12. Although the present embodiment is described with reference to computer system 10, it is to be understood that the present example is chosen for illustrative purposes only, and that other configurations and hardware are possible, in particular, locally attached storage media 12 can be formed of fewer or greater numbers of storage structures, e.g., storage media "c:/"-storage media "n:/", and with individually different storage capacities and type, such as for example, hard disk, flash drive, diskette, CD-ROM, DVD, and the likes.

In FIG. 1, in one embodiment, computer system 10 includes one or more network interface(s) 14 which provide connectivity to network (not shown). Such an embodiment is useful in situates when a networked storage media is to be analyzed by the system 10 using the method of the present invention. In the present embodiment, computer system 10 further includes: a processor 16; an operating system 18; loaded application modules 20; a memory 22; and a data reassembly application 24. The data reassembly application 24 implements a method 100 (FIG. 5) according to the present invention and provides a number of graphical user interfaces (GUIs) which each can be provided on display 26 for user input and output of results.

Figure 3:
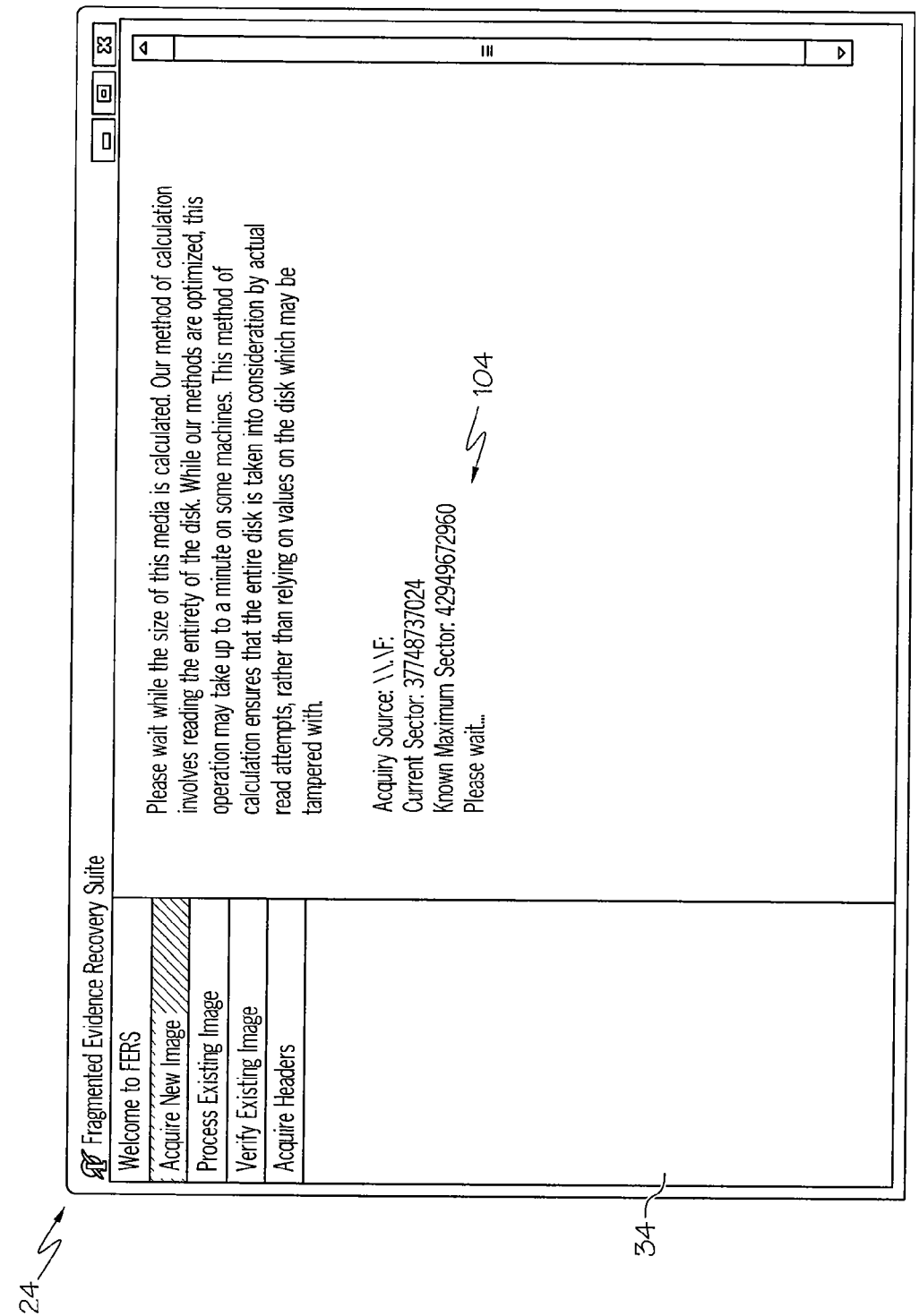
Figure 4:
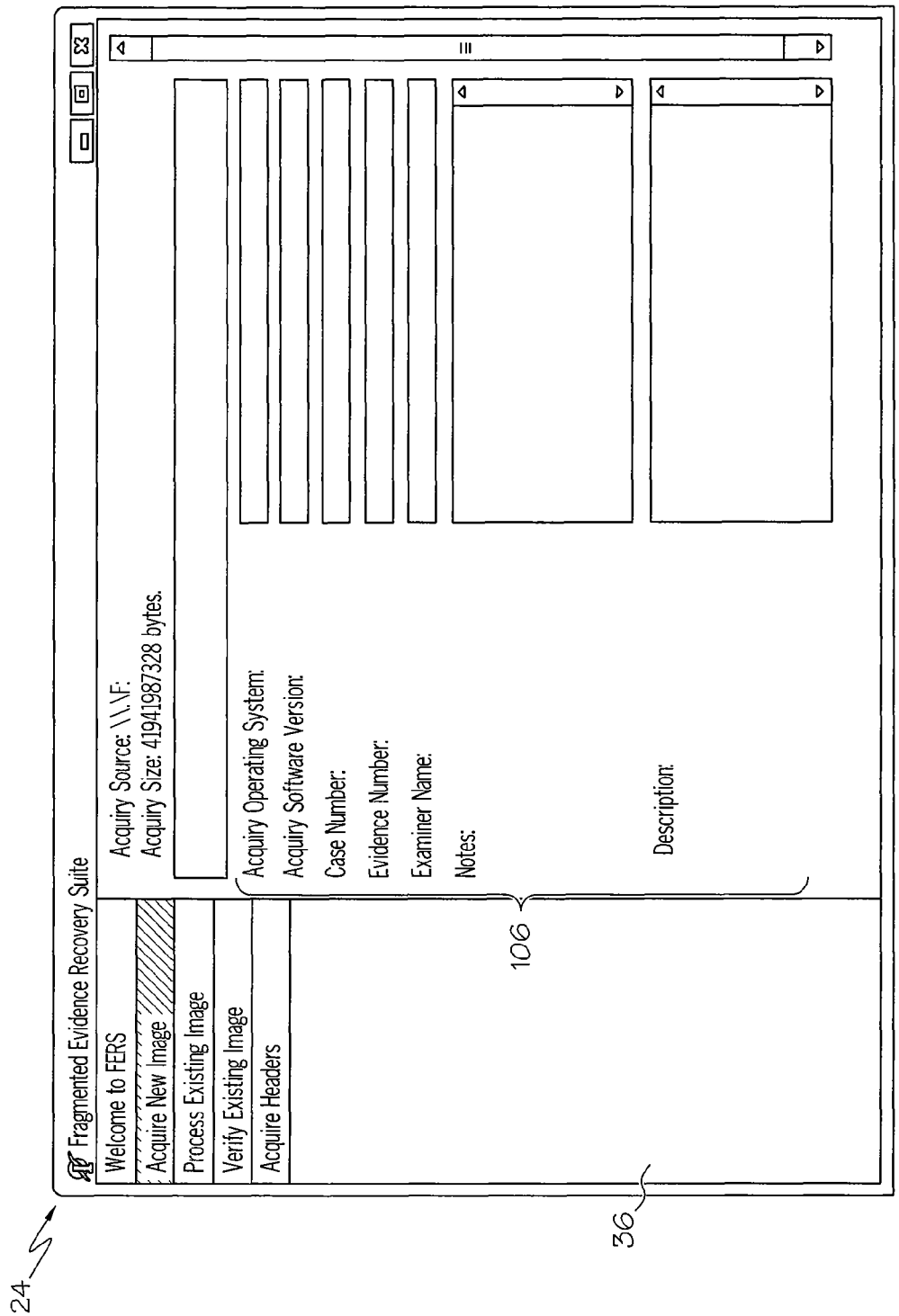

FIGS. 2-4 are screen shots of some of the GUIs of the data reassembling application 24 herein after referred to as "FERS" according to an illustrated embodiment. One of the shown tool features in a first GUI 28 of FERS is Acquire new image process 30 which operates according to the method 100 of the present invention discussed hereinafter. It is to be appreciated that other tool features shown in the graphical user interface, namely Process existing image process 40, Verify an existing image process 50, and Acquire header process 60 exist but which are not discussed individually herein as being only variations of the process discussed hereafter for the Acquire new image process 30. In addition, still other tool features of the present invention not shown include: a fully functional hex editor, image thumbnail viewing for located image (including ability to view partial image fragments for some image types), and the manual reassembly page where sector offsets are listed and allow the analyst to select which sectors to put into a file (carving). It is to be appreciated, and as explained hereafter in a later sections, the automated reassembly takes little user input, so a progress page is provided which shows overview reports while the reassembly code works. In other embodiments, means to generate images of active partitions and allow for navigation of the file system as though the files were being navigated through Windows Explorer may be provided if desired.

Referring first to FIG. 2, a user can select one of the features of the present invention from a tool bar (e.g., side tool bar 70). In the illustrated example, the user has selected to Acquire New Image process 30. On the GUI 28 the user selects the source from which to acquire the new image. It is to be appreciated that acquiring a new image allows a forensic snapshot of the selected digital storage media 20 to be generated. While the acquiring process never issues any writes to the selected media 20, in one embodiment a write blocker 32 (FIG. 1) is used to prevent any writes to the forensic source. It is to be appreciated that although in the illustrated embodiment the write blocker 32 is implemented as software, in other embodiments is may by implemented as hardware.

Figure 5:
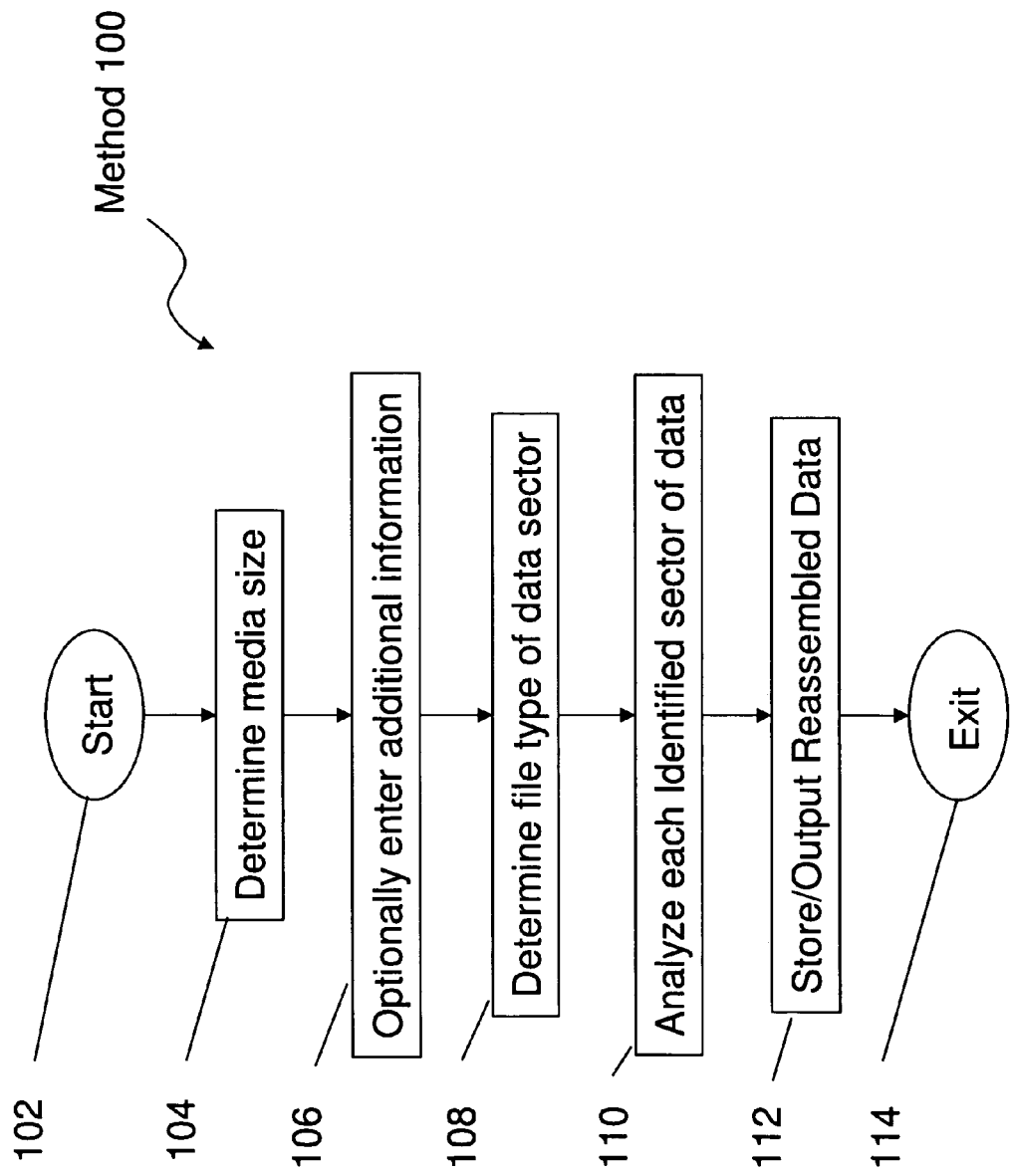
FIG. 5 is a functional block diagram of the method depicted in FIG. 1 according to the present invention.

After the user has selected the input source, next with reference to FIGS. 3 and 5, the method 100 of the present invention is started at step 102. In step 104, the size of the selected digital storage media 20 is calculated and provided to the user at completion as shown by FIG. 3 in a second GUI 36. The method 100 of the present invention involves reading the entirety of the selected media 20 to ensure that the entire media is taken into consideration by actual read attempts, rather than relying on values on the media which may be altered through tampering. Next, in optional step 106 and as shown by FIG. 4 in a third GUI 38, the user may enter additional parameters for header information that will be present within the image. As shown, for example, the present invention requests from the user, the acquiry operating system, the acquiry software version, a case number, an evidence number, any notes, description, etc. A discussion of the remaining processes according to the present invention now follows with reference made to FIG. 5.

It is to be appreciated that for process steps 108 and 110, namely, determine file type and analyze each identified sector of data, respectively, which have been employed by a development build of FERS, the actual processes depends directly upon the file type being recovered. As there are numerous file types (such as JPEG, GIF, and EXE) with each file type having a publicly documented file structures, the following illustrated embodiment discusses only .gif format for convenience and brevity of discussion.

The .gif format begins with a GIF87a or GIF89a. Each file header denotes a different format of the file type recognized as .gif. The next seven bytes of data after the file header is the logical screen definition. The logical screen definition contains information that defines the width, height, and other details about the image. After the logical screen definition, the .gif format will have blocks of data that vary in order and in count. However, each block must begin with one of the following byte values shown in Table 1 below.

TABLE 1

| Byte Value | Description/Block Type |
|---|---|
| 0x2C | Essence Picture |
| 0x21 | Extension Block |
| 0x01 | Graphic Label |
| 0xF9 | Control Process |
| 0xFE | Comment |
| 0xFF | Application Extension |

The structure of each block depends on the byte value that was detected. For example, when encountering a byte value of 0x2C (Essence Picture), the next nine bytes indicate parameters of the picture (2 startX, 2 startY, 2 width, 2 height, 1 infoLocalColor). When breaking up the infoLocalColor and reviewing it on a bit level, additional information about this block is determined, such as the length of an optional sub segment of data (local pallet of colors). The next value of interest is a one-byte value that indicates how many bytes to expect before the expected byte value of 0x00. Once reading the data and encountering a byte of 0x00, either a new recognizable header is processed, or a value of 0x3B is provided to indicate that the end of file has been reached. It is to be appreciated that the above discussion provides a basic overview of one type of file structure wherein the specifics will vary from file type to file type. As more specific information regarding other file types is available in public documents as mentioned previously, and well understood by those skilled in the related art, no further discussion thereon is provided.

The method 100 employed by the development build embodiment of FERS then in step 108 reads data from the selected media 20 and reviews the data in each sector to determine the file type for the sector. For example, if FERS were to process a GIF image and encounter a header of 0x2C (Essence Picture), FERS would know exactly how many bytes to read before receiving a 0x00 indicating the end of the block as explained above in the previous paragraph. Therefore, when a new sector is being processed, FERS expects to find another 0x00 value after reading the length of bytes as indicated in the header by the 0x2C. If FERS does not encounter a byte of 0x00, then FERS know that the sector it is reading does not belong to the image; otherwise it would have ended with 0x00 and either begun a new header or contained the end-of-file value of 0x3B. This explanation uses only the Essence Picture (0x2C) header as an example. Recovery requires processing of all header types for the file, and for each file type, by analyzing the data itself to reassembly the data into a useable file.

Figure 6:
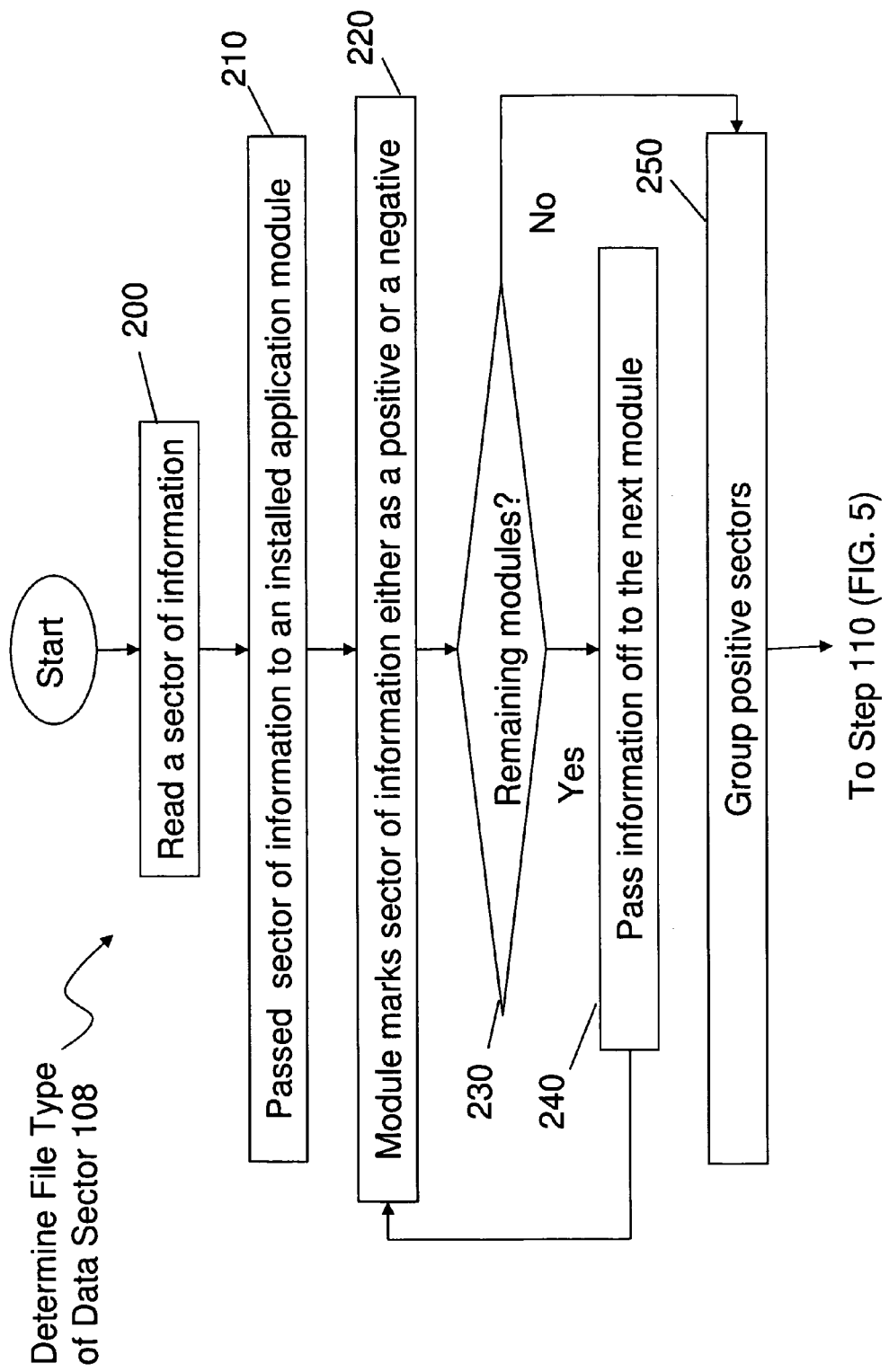
FIG. 6 is a functional block diagram of a determine file type analysis function according to the present invention.

The data reassembly application 24 (FIG. 1) has been design and implemented in a modular fashion. There are several key benefits to this design, most notably a reduction in processing time required and subsequently a reduction in recovery time. In particular, for the installed application modules 20 FERS utilizes the DLL (Dynamic Link Library) system under Windows, and the SO (Shared Object) system under Linux, which herein are referenced to as the installed application modules 20. With reference to FIG. 6, when a sector of information is being analyzed in step 108 to determine file type, after it is read in step 200, it is passed off to one of the installed application modules 20 in step 210. The receiving module will then analyze the sector of information and designate it either as a positive or a negative in step 220.

Figure 7:
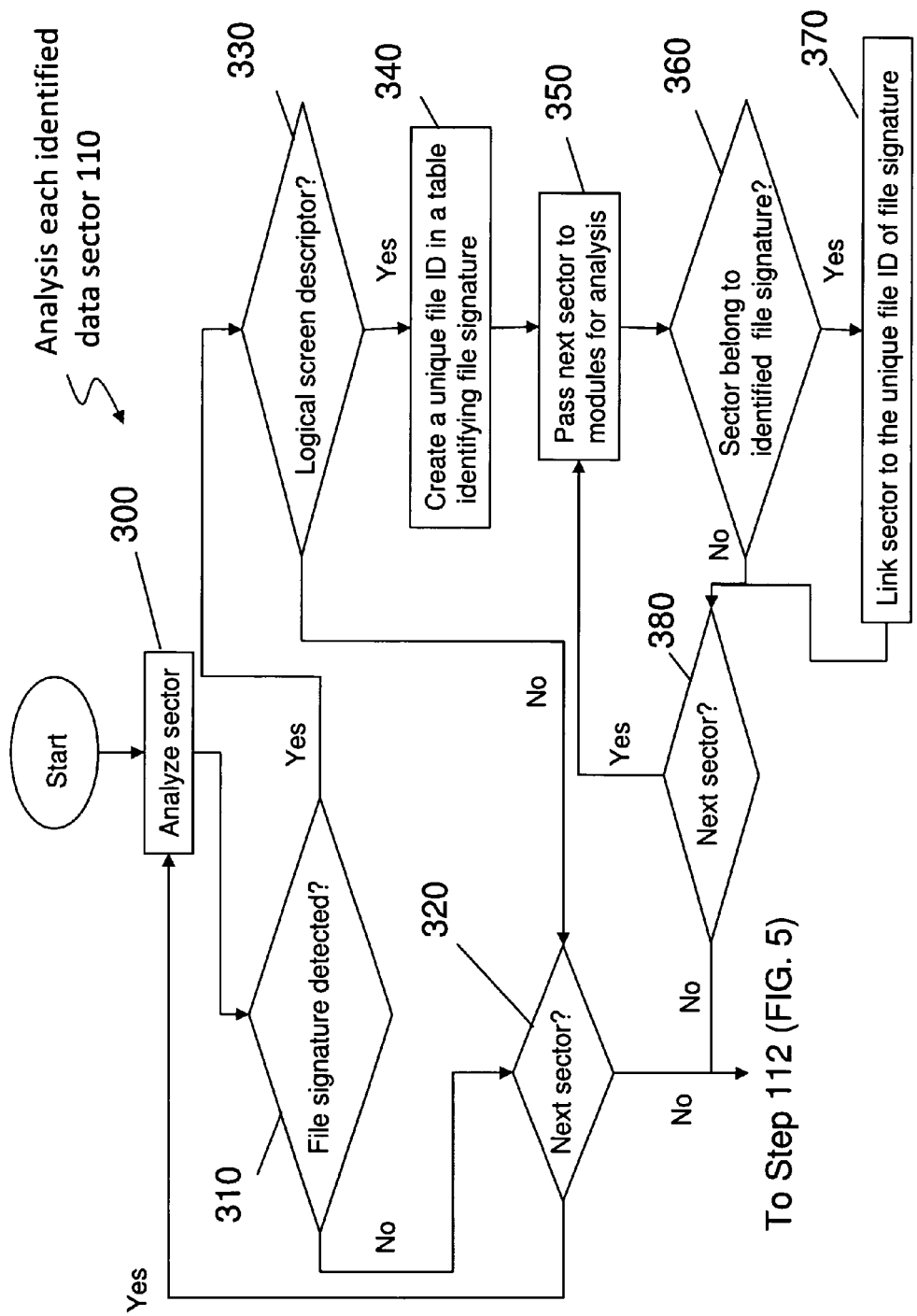
FIG. 7 is a functional block diagram of an analysis function according to the present invention.

Then, in step 230, FERS checks to see if there are any remaining modules 20 to be used in step 108. The sector of information is analyzed by all modules 20, which in one embodiment may be pre-selected by the user in a GUI of FERS (not shown). If so, then in step 240 FERS will pass the sector of information off to a next module to repeat the process in step 220. If not, then in step 250 if the sector of information is marked positive by one of the modules 20, the sector is grouped with and eventually compared against all other sectors that were also marked positive by the module in step 220. By eliminating unnecessary modules, FERS achieves a reduction in processing time during the reassembly process which takes place in the analysis Next for the analysis step 110 and with reference to FIG. 7, FERS will take each sector of information from the group in step 300 and check it to see if the data in the sector meets the criteria for the file signature supported by the module providing the positive mark in step 310. In the case of the GIF example, the file signature check function would be looking for a GIF87a or GIF89a header. If sector does not have a header in the illustrated embodiment, then in step 320 FERS checks to see if there is a next sector in the group. If so, the steps 300 and 310 are repeated for the next sector. If a header is detected in step 310, then FERS in step 330 checks for the existence of the logical screen descriptor values which should immediately follow, thereby verifying that the sector is a file signature.

When the file signature is detected, a new entry is created in a table in step 340 to uniquely identify this file. The next sector is then passed to the module for analysis in step 350, which FERS checks to see if belonging to the identified file signature in step 360. Any subsequent sectors that FERS finds that belong to this file signature are linked to the associated unique file ID in step 370. FERS then checks in step 380 if a next sector exists, and if so steps 350 is repeated. If not, then process 110 is completed and FERS moves on to step 112 to save and output the result of the reassembly of the file.

It is to be appreciated that in step 350 when passing a sector to the installed modules for analysis, FERS also places a pointer in the table to the data under the corresponding file ID. This will later allow FERS to appropriately validate the sector to ensure it belongs to the file being reassembled. The result of the module analysis in step 360 can be used to indicate a match or not. A result value of zero indicates that the sector did not match; a result of one indicates the sector did match and should be appended to the unique file ID. A result of two indicates there was not enough data to confirm a match but it is still possible that it does match so it should be appended as a possibility to the unique file ID. When these possibilities occur, FERS creates a tree in memory. The following example in Table 2 gives a sample visual of the structure of this tree.

TABLE 2

Tree Structure

Image in Memory ID XYZ
Confirmed Sector X
Confirmed Sector Y
Possible Sector Y, A
Possible Sector Y, B Possible sectors can be changed into confirmed sectors once more data is analyzed. In cases where sectors cannot be completely confirmed or rejected, FERS will attempt to use them during reassembly to avoid false negatives.

It is to be appreciated that FERS has the capability to recover fragments of data from a hard disk without the data being sequential. For example, current software will allow for cropping data off a disk by recognizing a file signature. Once it finds another file signature, or the known footer for the file signature already found, it will crop all data from point Start to point End; and output it to a file. FERS will index these file signatures and actually review data patterns across the entire disk reassembling the files from what was once fragmented data.

The following example represented data contained in a fragmented drive, where each letter represents a sector (512 bytes):

ABBBCDDCCCAADCCACB.

In a situation like this, prior art programs would not be able to successfully reassemble any of these files because they are fragmented, and may not even validated the files as being valid. For example, Sector A#1 to Sector B#1 may contain a file signature, but because it lacks a file footer and it is therefore not valid. FERS, however, has the ability to verify file integrity itself. FERS sees Sector A#1 and Sector B#1 as different signatures. Sector B#2 and Sector B#3 would be appended to Sector B#1 as FERS recognizes the data patterns as being consistent. FERS sees Sector C#1 as being it's own node in the tree, as well as Sector D#1. Sector D#2 would be recognized by FERS and appended to Sector D#1. From there in the sector, the next three Sector C's would be appended to the parent node for Sector C#1 by FERS. Accordingly, FERS is actually analyzing the data itself and reassembling the files, not just by recognition of file signatures and footers.

The following detailed example illustrates one embodiment of the recovery pseudo-code of the present invention. It is to be appreciated that each file type supported has routines similar to the illustrated embodiment, but not exactly as no global code can be applied to all file types, as each file type is different. Accordingly, for illustration of the principles involved, the following pseudo code outlines a GIF recovery process. While the basic principles remain with all other file types, the actual code that verifies fragments differs.

The below pseudo code is an example of what enables FERS to recovery different file types in the same application with a common interface and the individual recovery units. As mentioned, the recovery function is common with all modules to allow a common entry point.

The LZW_Decode function shown below in Table 3 is a modified GIF LZW decoding routine. It has been modified significantly so that only validation of data streams is performed. No actual GIF data is displayed or rendered from the results of LZW_Decode routine, but could be in other embodiments if such is a desired. As provided by the LZW_Decode routine, if the requested length is less than what is actually left to read, the routine only reads what is left. Once the data is read, the LZW_Decode routine sets up the bit and byte ranges for future processing.

TABLE 3

LZW_Decode routine function LZW_Decode(AData: Pointer; ALength: Integer): LZW_RESULT;
function LZW_NextCode(ABitsPerCode: Integer): LZW_RESULT;
const
C_MASKS: array[0..15] of Integer =
($0000, $0001, $0003, $0007,
$000f, $001f, $003f, $007f,
$00ff, $01ff, $03ff, $07ff,
$0fff, $1fff, $3fff, $7fff);
begin
if (ShouldReturnClearCode) then
Set ShouldReturnClearCode = FALSE and return clear code
if (EndBit >= LastBit) then
if (GetDone) then
begin
if (StartBit >= LastBit) then
Return error, there are too few bits to decode
else
Return error, excessive end bit (EndBit >= LastBit)
end;
if (ReadByte(Length) <> one byte read) then
Return error, out of data to process
if (length = 0) then
ZeroBlock = GetDone = TRUE
else
begin
if (LengthInBufferLeft < length) then
length = LengthInBuffer;
if (ReadData(length) <> length) then
Return error, out of data to process
end;
LastByte = length + 2;
StartBit = (StartBit − LastBit) + 16;
LastBit = LastByte * 8;
EndBit = StartBit + ABitsPerCode;
end;

The LZW_Decode routine sets the index values in a buffer table based on the bits configured, and error checks. An example of such an error check is shown by Table 4.

TABLE 4

Error Check

EndIndex = EndBit div 8
StartIndex = StartBit div 8
if (StartIndex > Indexes in buffer table) then
Return error, start index too big Next, the LZW_Decode routine calculates the actual result value from a table now populated with set up values and performs some minor error-checking routines to ensure a valid data stream as shown by Table 5.

TABLE 5

Determine Valid data stream if (StartIndex = EndIndex) then
Result.Value = buffer[StartIndex]
else begin
if (StartIndex + 1 = EndIndex) then
Result.Value = buffer[StartIndex] or (buffer[StartIndex + 1] shl 8);
else
Result.Value = buffer[StartIndex] or (buffer[StartIndex + 1] shl 8) or (buffer[StartIndex + 2] shl 16);
end;
Result.Value = (Result.Value shr (StartBit and $0007)) and C_MASKS[ABitsPerCode];
Increment StartBit by ABitsPerCode;
end;

Continuing with the example, a LZW_Next function then gets the next code with the current bits per code. The LZW_Next function is shown by Table 6.

TABLE 6

LZW_Next function function LZW_Next( ): LZW_RESULT;
begin
lzwResult = LZW_NextCode(BitsPerCode);
if (lzwResult is an error and not an actual LZW code) then
if (lzwResult error code is non-recoverable) then
Return error, bad chunk of data
code = lzwResult LZW code
while (code >= 0) do
begin
if (code = ClearCode) then
begin
Clear buffer tables 0 to ClearCode − 1 with index
Clear buffer tables ClearCode to TableSize − 1 with 0.
BitsPerCode = InitialBitsPerCode + 1;
MaxCodeSize = 2 * ClearCode;
MaxCode = ClearCode + 2;
SourcePtr = @stack;

The LZW_Next routine next gets a LZW result code that isn't an error code or clear code. This step is shown by Table 7.

TABLE 7

LZW NextCode repeat
lzwResult = LZW_NextCode(BitsPerCode);
if (lzwResult is an error and not actual LZW code) then
Return lzwResult error;
firstCode = lzwResult.Value;
oldcode = firstCode;
until (firstCode <> ClearCode);
Return Result.Value = firstCode;
end

TABLE 7-continued

LZW NextCode else if (code = EOFCode) then
begin
if (LengthInBufferLeft > 0) then
Return error, got EOF code but data remains
else
Return success, got EOF and no more data left
end The LZW_Next routine next calculates the code to return, which is obtained by calculations and values on the stack via SourcePtr term which set the value of a current source pointer to a first code value. This step is shown by Table 8.

TABLE 8

Calculate code to return begin
incode = code;
if (code >= MaxCode) then
begin
SourcePtr^ := firstCode; //set value of current source pointer to firstCode value
increment SourcePtr to next entry
code = oldCode;
end;
if (code >= TableSize) then
Return error, decode code too big
while (code >= ClearCode) do
begin
//do some address checking
if (SourcePtr > @Stack + Length(stack)) then
Return error, stack overflow
   //set the source pointer value to the table1 table at code index
SourcePtr^ = table1[code];
Increment SourcePtr to next element
if (code = table0[code]) then
Return error, circular reference
code = table0[code];
if (code >= TableSize) then
Return error, code too big
end;
firstCode = table1[code];
SourcePtr^ = firstCode;
increment SourcePtr to next element
code = MaxCode;
if (code <= max possible GIF code) then
begin
table0[code] = oldCode;
table1[code] = firstCode;
increment MaxCode as we just added a new code in the table
if (MaxCode >= maximum code size allowed) and (MaxCodeSize <= maximum GIF allowed code size) then
begin
//get some more buffer space by doubling the code size
MaxCodeSize = MaxCodeSize * 2;
increment BitsPerCode by one
end;
end;
oldCode = inCode;
if (sourcePtr > @stack) then
begin
Decrement SourcePtr by one
Return success, Result.Value = sourcePtr^
end;
end;
end;
return success, Result.Value = code;
end;

The function LZW_ReadLZW, will then take results of SourcePtr and fill up a stack. This step is shown by Table 9.

TABLE 9

LZW_ReadLZW

```
function LZW_ReadLZW( ): LZW_RESULT;
begin
if (SourcePtr > @stack) then
begin
Decrement sourcePtr by one (pop off stack)
Return Result.Value = SourcePtr^
end;
lzwResult := LZW_Next( );
if (lzwResult is an error and not an LZW code) then
Return error, whatever error is contained in lzwResult.Value
else
Return success, value is whatever is contained in lzwResult.value
end;
```

Next, the LZW_ReadLZW routine sets up bits per code, some values, clear code, and the like. This step is shown by Table 10.

TABLE 10

LZW_ReadLZW

```
begin
InitialBitsPerCode = ReadByte( );
BitsPerCode = InitialBitsPerCode + 1;
ClearCode = 1 shl InitialBitsPerCode;
EOFCode = ClearCode + 1;
MaxCodeSize = 2 * ClearCode;
MaxCode = ClearCode + 2;
StartBit = 0;
LastBit = 0;
LastByte = 2;
ZeroBlock = False;
GetDone = False;
ReturnClearCode = TRUE;
SourcePtr = @stack;
```

The LZW_ReadLZW routine keeps reading code values until an error, then see if the error is a hard or soft failure. If it's a hard failure (circular reference, bad chunk, etc.) then the block of data provided isn't a valid GIF stream, thus repeat read the next LZW value. ReadLZW will call any needed functions to either process a value off the stack, or read data from the input parameters and fill the stack with a value to use. This step is shown by Table 11.

TABLE 11

LZW_ReadLZW continue

```
lzwResult = LZW_ReadLZW( );
if (lzwResult is an error) then
Return error, whatever value is in lzwResult.Value (circular reference, etc)
until (false);
end;
```

The logic term Until (false) in Table 11 is true until the routine eventually runs out of input data, or gets an error back due to stack overflows, circular references, bad code sizes, etc. Once all data has been read then a soft-error of "no more data to process" is provided indicating that the data is likely from a GIF file. However, hard errors like "code too big", "circular reference", "stack overflow" indicate that the data given is likely not from a GIF file.

Other functions such as XMIN, XMAX, GPercent, PrintableCharCount, and IsASCIIPrintable used in the recovery process are also shown below in Tables 12-16.

TABLE 12

XMIN

```
function XMIN(const AValue1, AValue2: DWORD): DWORD;
begin
if (AValue1 < AValue2) then
Result := AValue1
else
Result := AValue2;
end;
```

TABLE 13

XMAX

```
function XMAX(const AValue1, AValue2: DWORD): DWORD;
begin
if (AValue2 > AValue1) then
Result := AValue2
else
Result := AValue1;
end;
```

TABLE 14

GPercent

```
function GetPercent(const AScore, AMaxPoints: DWORD;
 const AWeight: Byte = 100): Byte;
begin
if ((AScore = 0) or (AMaxPoints = 0)) then
Result := 0
else
Result := Trunc( (AScore / AMaxPoints) * AWeight);
end;
```

TABLE 15

PrintableCharCount

```
function PrintableCharCount(ABuffer: PByte; const ALength: DWORD):
DWORD;
var
pPos: PByte;
begin
Result := 0;
pPos := ABuffer;
while (Integer(pPos) <= Integer(ABuffer) + ALength) do
begin
if ((pPos^ >= 32) and (pPos^ <= 126)) then
Inc(Result);
Inc(pPos);
end;
end;
```

TABLE 16

IsASCIIPrintable

```
function IsASCIIPrintable(ABuffer: PByte; const ALength:
DWORD): BOOL;
var
pPos: PByte;
begin
Result := TRUE;
pPos := ABuffer;
while (Integer(pPos) <= Integer(ABuffer) + ALength) do
```

TABLE 16-continued

IsASCIIPrintable

```
begin
if ((pPos^ < 32) or (pPos^ > 126)) then
begin
Result := FALSE;
Break;
end;
```

TABLE 16-continued

IsASCIIPrintable

```
Inc(pPos);
end;
end;
```

Structure of the image descriptor within the file is determined by the function Handle_ImageDescriptor, which is shown by Table 17.

TABLE 17

Handle_ImageDescriptor

```
TImageDescriptor = packed record
Left: Word; { Column in pixels in respect to left edge of logical screen }
Top: Word; { row in pixels in respect to top of logical screen }
Width: Word; { width of image in pixels }
Height: Word; { height of image in pixels }
PackedFields: Byte; { Bit fields }
end;
function Handle_ImageDescriptor(var APos: PByte; var ALength: DWORD):
TX_BlockResult;
var
imageDescriptor: TImageDescriptor;
localColorMap: array[$00..$FF * 3] of Byte;
begin
Read data from APos into imageDescriptor
if IS_SET(imageDescriptor.PackedFields, ID_LOCAL_COLOR_TABLE) then
begin
Read data into localColorMap
iColorCount = (2 shl imageDescriptor.PackedFields) and ID_LOCAL_COLOR_TABLE;
if (iColorCount < 2) or (iColorCount > 256) then
invalid color count index, may not be a valid image descriptor
end else begin
if (bits 4 and 3 in PackedFields are set) then
this may not be an image descriptor, these bits are supposed to remain unset
end;
end else
begin
//using global color pallet
if (bits 4 and 3 in PackedFields are set) then
this may not be an image descriptor, these bits are supposed to remain unset
//no color pallet follows because we're instructed to use the global color
pallet
if (not GlobalPalletExists) then
this image descriptor would not belong to any images with no global pallet
end;
//normally images are in a 3:4 or 4:3 aspect ratio for digital cameras
if (XMIN(imageDescriptor.Width, imageDescriptor.Height) /
XMAX(imageDescriptor.Width, imageDescriptor.Height) = 0.75) then
this is a good sign as it meets a 3:4 or 4:3 aspect ratio, we can also verify
a range and look at images with a ratio
around 0.60 to .80. Increment result possibility
end;
//first image descriptors are at offsets of 0, 0 for top and left
if (ImageDescriptorCount = 0) then
if (imageDescriptor.Top = 0) and (imageDescriptor.Left = 0) then
Good sign, increment result possiblity
//usually the width and height + top and left fit within the screen
descriptor
        if (imageDescriptor.Left + imageDescriptor.Width <=
screenDescriptor.Width) and
(imageDescriptor.Top + imageDescriptor.Height <= screenDescriptor.Height)
then
Good sign, increment result possiblity
end;
```

The file trailer can be on any byte position, but after that the disk space up to the remaining sector is filled with 0's. From the mod of 512, the original data on the hard drive remains. Thus, we need to look for 0's up to a mod of 512 after GIF_FILE_TRAILER. A function Handle_FileTrailer performs this task and is shown by Table 18.

TABLE 18

Handle_FileTrailer

```
function Handle_FileTrailer(var APos: PByte; var ALength:
DWORD; const
AOriginalStartPos: PByte): TX_BlockResult;
var
dwByteOffset: DWORD;
bNullSectorFill: BOOL;
begin
if (APos = GIF_FILE_TRAILER) then
begin
dwByteOffset = APos – AOriginalStartPos;
bNullSectorFill := TRUE;
while ((bNullSectorFill) and ((dwByteOffset mod 512) <> 0)) do
begin
if (ReadByte(b, APos, ALength) = 1) then
bNullSectorFill := (b = $00)
else
Break;
end;
end;
end;
```

As there are multiple extensions with GIF files, a handler function is provided which determines when a GIF extension is being processed. For example, the function shown in Table 19 determines which GIF extension it is, where ReadByte( ) gets the extension value.

TABLE 19

Handle_Extension

```
function Handle_Extension(var APos: PByte; var ALength: DWORD):
TX_BlockResult;
begin
case (ReadByte( )) of
C_GIF_EXTENSION_APPLICATION: Result :=
Handle_Extension_Application(APos, ALength);
C_GIF_EXTENSION_COMMENT: Result :=
Handle_Extension_Comment(APos, ALength);
C_GIF_EXTENSION_PLAIN_TEXT: Result :=
Handle_Extension_Plain_Text(APos, ALength);
C_GIF_EXTENSION_GRAPHIC_CONTROL: Result :=
Handle_Extension_Graphic_Control(APos, ALength);
end;
end;
```

The extension structure for a plain text record which compares extension data to the logical screen descriptor that is being analyzed, reads the length of the text. This step is handled by the function Handle_Extension_Plain_Text shown by Table 20.

TABLE 20

Handle_Extension_Plain_Text

```
function Handle_Extension_Plain_Text(var APos:
PByte; var ALength: DWORD):
TX_BlockResult;
type
TX_PTExt = packed record
BlockSize: Byte; { should be 12 }
Left, Top, Width, Height: Word;
CellWidth, CellHeight: Byte;
```

TABLE 20-continued

Handle_Extension_Plain_Text

```
TextFGColorIndex, TextBGColorIndex: Byte;
end;
var
ext: TX_PTExt;
field_length: Byte;
buffer: array[0..$FF] of Char;
begin
Read data to fill extension record ext
where LS = logical screen descriptor; make sure that:
ptExt.Left <= LS.Width – ptExt.CellWidth
ptExt.Top <= LS.Height – ptExt.CellHeight
ptExt.TextGridWidth <= LS.Width
ptExt.TextGridHeight <= LS.Height
ptExt.CellGridWidth <= ptExt.TextGridWidth
ptExt.CellGridHeight <= ptExt.TextGridHeight
end;
field_length = ReadByte( );
ReadData into buffer[0], for field_length bytes
end;
```

Next, the structure of a Graphic Control Extension is provided as shown by Table 21.

TABLE 21

Graphic Control Extension

```
TX_GCE_Data = packed record //graphic control extension
BlockSize: Byte; //always 4
PackedFields: Byte; //reserved, disposal method, user flag, transparent
color flag
DelayTime: Word; //in centiseconds
TransparentColorIndex: Byte;
Terminator: Byte; //0
end;
```

The structure is called from the function Handle_Extension_Graphic_Control, which is shown by Table 22.

TABLE 22

Handle_Extension_Graphic_Control

```
function Handle_Extension_Graphic_Control(var APos: PByte;
var ALength: DWORD): TX_BlockResult;
var
gce: TX_GCE_Data;
begin
//animation control extension.. this is GIF89a specific. Not applicable to
GIF87a
Read data from APos into gce for a length of SizeOf(TX_GCE_Data)
Confirmed that gce.BlockSize = $04 and gce.Terminator = $00
if (gce.TransparentColorIndex > 0) then
begin
Confirm that bit 1 shl 0 is set in gce.PackedFields
Check gce.TransparentColorIndex against active local/global values to
ensure
that the TransparentColorIndex is a valid entry
end
else
Confirm that bit 1 shl 0 is NOT set in gce.PackedFields
end;
```

When there's an extension comment, the contents of the comment section are required by the GIF standard to be ASCII characters. Anything that generates GIF files that don't contain ASCII printable characters has thus far been unseen in any demonstrations or files reviewed. This includes tens of thousands of GIF files where automated verification has taken place to review the contents of the GIF comment sections. Typically, users know nothing of these comment sections; and they get filled with data by the generating application or digital cameras. The Handle_Extension_Comment and Handle_Extension_Application functions are shown by Tables 23 and 24.

TABLE 23

Handle_Extension_Comment

```
function Handle_Extension_Comment(var APos: PByte;
var ALength: DWORD): TX_BlockResult;
var
buffer256: packed array[$00..$FF] of Char;
theLength: byte;
begin
repeat
read first byte into theLength, which indicates the length of the comment
//there can be X comments.. only indication of end is a 0 length block
if (theLength = 0) then
break;
read theLength bytes into buffer256[0]
run buffer through IsASCIIPrintable
until false;
end;
```

TABLE 24

Handle_Extension_Application

```
function Handle_Extension_Application(var APos: PByte;
var ALength: DWORD): TX_BlockResult;
var
bufferIdent: packed array[0..10] of Char;
buffer256: array[0..$FF−1] of Char;
bExtensionLength: Byte;
bSubBlockLength: Byte;
begin
Read one byte into bExtensionLength
if (bExtensionLength = 10 or 11) then
begin
Read bExtensionLength bytes into bufferIdent[0]
Check that all 11 bytes in bufferIdent should be ASCII printable
repeat
Read one byte into bSubBlockLength
if (bSubBlockLength = 0) then Exit, no more sub blocks
read bSubBlockLength bytes into buffer256[0]
until (false);
end;
end;
```

Structure of a screen descriptor is provided by the function Handle_ScreenDescriptor shown by Table 25.

TABLE 25

Handle_ScreenDescriptor

```
TScreenDescriptor = packed record
Width: Word;
Height: Word;
PackedFields: Byte;
BackgroundColor: Byte;
end;
TGIFColor = packed record
R, G, B: Byte;
end;
function Handle_ScreenDescriptor(var APos: PByte;
var ALength: DWORD): TX_BlockResult;
var
sd: TScreenDescriptor;
colorMapCount: Integer;
colorTable: array[0..$FF − 1] of TGifColor;
begin
Read data into screen descriptor sd, for size of TScreenDescriptor
if IS_SET(sd.packedfields, 1 shl 7)) then
begin
read bits 2, 1 and 0 from packedfields into colorMapCount
//actual color mapping is 3 bytes per entry.. colorMapCount * 3 = amount
```

TABLE 25-continued

Handle_ScreenDescriptor

```
to read
set length of sd to colorMapCount
iterator x = 0 to colorMapCount − 1 do
read 3 bytes to colorTable[x]
end;
check to see if width or height are "crazy" for an image.. > 20000 on
width or height
if (backgroundColor > colorMapCount) then
something may be wrong with this data, so decrease result chance
return calculated result chance
end;
```

The next function Handle_FileSignature checks the first 6 bytes of the input data, as show by Table 26. There are two possible values here, GIF87a and GIF89a. After the file signature is the screen descriptor, per the GIF standard. we can go ahead and process the signature that should be following at this point.

TABLE 26

Handle_FileSignature

```
function Handle_FileSignature(var APos: PByte; var ALength: DWORD):
TX_BlockResult;
begin
Result = (CompareMemory(APos, 'GIF87a') = Success or
CompareMemory(APos, 'GIF89a') = Success);
end;
```

The above recovery pseudo code outlines the sub routines that analyze various aspects of input data to look for GIF related properties. Depending on the result of the function, the fragment may be classified as a possible GIF fragment. In the reassembly process, when a fragment is classified as a GIF fragment it can be appended to other GIF fragments and revalidated with the same routines. It is essentially like a puzzle where the pieces must line up properly to be validated. The terminator would be missing in cases where an incorrect GIF fragment is appended after reading a certain amount of bytes as defined in the header of the fragment. Therefore, it cannot be confirmed as a valid continuation fragment.

Any file type with a recognizable data structure is recoverable. Possible file types include, but are not limited to: executables, .zip files, JPEG files, .gif files, .png files, .avi files, .mpg (layers 1, 2, and 3) files, .wmv files, .rm files, Microsoft Money files, and more. Files with no recognizable structures, such as HTML, TXT, and other raw text file formats, currently are not automatically recoverable.

In one embodiment, the data reassembly application 24 of computer system 10 can be configured as a computer program product. Herein a computer program product comprises a medium configured to store or transport computer-readable instructions, such as program code, for application 24, including all, any, or parts of processes described herein with reference to FIGS. 1-7 and Tables 1-26, or in which computer-readable instructions for application 24, including all, any, or parts of processes described herein with reference to FIGS. 1-7 and Tables 1-26 are stored. Some examples of computer program products are CD-ROM discs, ROM cards, floppy discs, magnetic tapes, computer hard drives, servers on a network and signals transmitted over a network representing computer-readable instructions. Further herein, a means for performing a particular function is accomplished using the appropriate computer-readable instructions and the related hardware necessary to perform the function.

The foregoing description of implementations of the invention have been presented for purposes of illustration and description only, and, therefore, are not exhaustive and do not limit the invention to the precise forms disclosed. Modifications and variations are possible in light of the above teachings or can be acquired from practicing the invention. Consequently, Applicants do not wish to be limited to the specific embodiments shown for illustrative purposes.

We claim:

1. A method of reassembly a file from fragmented data written onto digital storage media without the aid of an intact primary or secondary file table, said method comprising:
   providing a graphical user interface which is configured to permit selection of a digital storage media;
   receiving input through the graphical user interface of a selected digital storage media containing fragmented data where file tables on the selected digital storage media have been damaged and/or destroyed;
   acquiring a forensic snapshot of the selected digital storage media in which writes to the selected digital storage media are prevented, and in which said acquiring the forensic snapshot includes determining actual size and number of sectors of the selected digital storage media by performing a read operation in which actual read attempts are made on the entire selected digital storage media;
   indicating at least one file type of each of the sectors as either positive or negative by passing each of the sectors in the selected digital storage media to at least one application module;
   analyzing all sectors indicated as positive for a file type to identify a file signature by analyzing other blocks besides a header to determine additional information about the blocks in each of the sectors;
   creating a unique file ID in a table for an identified file signature in the sectors;
   analyzing all remaining sectors to see if said remaining sectors belonging to said identified file signature by checking each of the remaining sectors against the at least one application module to see if data in each of the remaining sector meets criteria for the identifies file signature that the application module supports;
   linking belonging sectors to the unique file ID of the file signature to reassemble the file of fragmented data associated with the file type without the aid of the file tables on the selected digital storage media since being damaged and/or destroyed; and
   providing the reassembly file.

2. A computer system providing the method of claim 1, wherein the computer system comprises locally attached storage media and one or more network interfaces.

3. The method of claim 1, wherein the writes to the selected digital storage media are prevented via a write blocker.

4. The method of claim 1, wherein the selected digital storage media is one of a hard disk, flash drive, diskette, compact disc, and digital video disc.

* * * * *

UNITED STATES PATENT AND TRADEMARK OFFICE
CERTIFICATE OF CORRECTION

| | | |
|---|---|---|
| PATENT NO. | : 8,311,990 B2 | Page 1 of 1 |
| APPLICATION NO. | : 12/103405 | |
| DATED | : November 13, 2012 | |
| INVENTOR(S) | : Michael Martinek et al. | |

It is certified that error appears in the above-identified patent and that said Letters Patent is hereby corrected as shown below:

On the Title page, item (57):

"(57)                    ABSTRACT
A system and method of reassembly a file from fragmented data written onto digital storage media are disclosed. The data reassembling system and method is particularly useful for image data reconstruction, and in forensic data recovery. More particularly, the inventive concept allows for reassembling out-of-sequence data fragments."

should read

--(57)                    ABSTRACT
A system and method of reassembling a file from fragmented data written onto digital storage media are disclosed. The data reassembling system and method is particularly useful for image data reconstruction, and in forensic data recovery. More particularly, the inventive concept allows for reassembling out-of-sequence data fragments.--.

In the Claims:

Col. 19, Claim 1, Line 19, "A method of reassembly a file" should read --A method of reassembling a file--; and Col. 20, Claim 1, Line 11, "remaining sector meets criteria for the identifies file" should read --each of the remaining sectors meets criteria for the identified file--.

Signed and Sealed this
Fifth Day of November, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,311,990 B2  
APPLICATION NO. : 12/103405  
DATED : November 13, 2012  
INVENTOR(S) : Michael Martinek et al.

Page 1 of 1

It is certified that error appears in the above-identified patent and that said Letters Patent is hereby corrected as shown below:

On the Title page, item (57):

"(57)                         ABSTRACT  
A system and method of reassembly a file from fragmented data written onto digital storage media are disclosed. The data reassembling system and method is particularly useful for image data reconstruction, and in forensic data recovery. More particularly, the inventive concept allows for reassembling out-of-sequence data fragments."

should read

--(57)                        ABSTRACT  
A system and method of reassembling a file from fragmented data written onto digital storage media are disclosed. The data reassembling system and method is particularly useful for image data reconstruction, and in forensic data recovery. More particularly, the inventive concept allows for reassembling out-of-sequence data fragments.--.

In the Claims:

Col. 19, Claim 1, Line 10, "A method of reassembly a file" should read --A method of reassembling a file--; and Col. 20, Claim 1, Line 11, "remaining sector meets criteria for the identifies file" should read --each of the remaining sectors meets criteria for the identified file--.

This certificate supersedes the Certificate of Correction issued November 5, 2013.

Signed and Sealed this  
Tenth Day of December, 2013

Margaret A. Focarino  
*Commissioner for Patents of the United States Patent and Trademark Office*